United States Patent
Retana et al.

(10) Patent No.: US 7,940,668 B2
(45) Date of Patent: May 10, 2011

(54) METHOD AND APPARATUS TO ENABLE AN IPE DOMAIN THROUGH EIGRP

(75) Inventors: Alvaro E. Retana, Raleigh, NC (US); Russell I. White, Holly Springs, NC (US); Yi Yang, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 281 days.

(21) Appl. No.: 12/052,861

(22) Filed: Mar. 21, 2008

(65) Prior Publication Data

US 2009/0238076 A1  Sep. 24, 2009

(51) Int. Cl.
*H04J 1/16* (2006.01)
(52) U.S. Cl. ........................................ 370/238; 370/252
(58) Field of Classification Search .................. 370/238, 370/252, 253, 389, 392–395.31
See application file for complete search history.

(56) References Cited

U.S. PATENT DOCUMENTS

| | | | |
|---|---|---|---|
| 6,032,194 A | 2/2000 | Gai et al. | |
| 6,484,209 B1 | 11/2002 | Momirov | |
| 6,578,086 B1 | 6/2003 | Regan et al. | |
| 6,836,463 B2 | 12/2004 | Garcia-Luna-Aceves et al. | |
| 7,023,808 B2 | 4/2006 | Ball et al. | |
| 7,042,834 B1 | 5/2006 | Savage | |
| 7,123,620 B1 | 10/2006 | Ma | |
| 7,174,371 B2 | 2/2007 | Elo et al. | |
| 7,203,191 B2 | 4/2007 | Garcia-Luna-Aceves et al. | |
| 7,230,914 B2 | 6/2007 | Sankar et al. | |
| 7,260,518 B2 | 8/2007 | Kerr et al. | |
| 7,298,707 B2 | 11/2007 | Retana et al. | |
| 7,302,482 B2 | 11/2007 | Rodosek et al. | |
| 7,319,674 B2 | 1/2008 | Chandra et al. | |
| 7,325,069 B1 | 1/2008 | Gage et al. | |
| 7,333,501 B2 | 2/2008 | Cook et al. | |
| 7,450,495 B2 * | 11/2008 | Guerin et al. | 370/217 |
| 7,466,703 B1 * | 12/2008 | Arunachalam et al. | 370/392 |
| 7,525,920 B2 | 4/2009 | Guerin et al. | |
| 7,693,073 B2 * | 4/2010 | Soja-Molloy et al. | 370/238 |
| 7,693,939 B2 | 4/2010 | Wu et al. | |
| 7,821,956 B2 | 10/2010 | Retana et al. | |
| 2003/0107992 A1 | 6/2003 | Garcia-Luna-Aceves et al. | |
| 2004/0213167 A1 | 10/2004 | Garcia-Luna-Aceves et al. | |
| 2005/0073998 A1 | 4/2005 | Zhu et al. | |
| 2005/0135256 A1 | 6/2005 | Ball et al. | |

(Continued)

OTHER PUBLICATIONS

Perkins et al., Ad Hoc On-Demand Distance Vector (AODV) Routing, Jul. 2003 p. 14.*

(Continued)

*Primary Examiner* — Ricky Ngo
*Assistant Examiner* — Kan Yuen
(74) *Attorney, Agent, or Firm* — Patent Capital Group

(57) ABSTRACT

In one embodiment, a system, method, and apparatus for preventing excessive transmission of routing information in a communications network occurs by receiving a network routing address at a connection node in a communications network, the network routing address allowing the transmission of data packets from a source node to a destination node in the communications network; determining a longest summary route covering a path to the destination node; creating a list comprising a summary of all neighbor connection nodes of the connection node; and transmitting an update of the longest summary route of the network routing address towards all neighbor nodes advertising a destination address comprising a shorter address prefix, wherein the transmitting process occurs sequentially beginning with a first neighbor connection node entered in the list.

19 Claims, 6 Drawing Sheets

U.S. PATENT DOCUMENTS

| | | | |
|---|---|---|---|
| 2006/0007865 A1 | 1/2006 | White et al. | |
| 2006/0282511 A1* | 12/2006 | Takano et al. | 709/217 |
| 2006/0291404 A1 | 12/2006 | Thubert et al. | |
| 2007/0019647 A1 | 1/2007 | Roy et al. | |
| 2007/0115837 A1 | 5/2007 | Elie-Dit-Cosaque et al. | |
| 2007/0121521 A1 | 5/2007 | D'Amico et al. | |
| 2007/0237095 A1* | 10/2007 | Yang et al. | 370/254 |
| 2007/0291663 A1 | 12/2007 | Dixit et al. | |
| 2008/0031236 A1 | 2/2008 | Yang et al. | |
| 2008/0043635 A1 | 2/2008 | Retana et al. | |
| 2009/0091465 A1* | 4/2009 | Buckingham et al. | 340/683 |
| 2009/0147723 A1 | 6/2009 | Fang et al. | |
| 2010/0091823 A1 | 4/2010 | Retana et al. | |

OTHER PUBLICATIONS

Chandra, M and Roy, A, Extensions to OSPF to Support Mobile Ad Hoc Networking, draft-chandra-ospf-manet-ext-05, Aug. 1, 2007, p. 32, Publisher: http://tools.ietf.org/html/, Published in San Jose, California, US.

* cited by examiner

METHOD AND APPARATUS TO ENABLE AN IPE DOMAIN THROUGH EIGRP

TECHNICAL FIELD

The embodiments herein generally relate to communication networks, and, more particularly, to Internet Protocol (IP) routing in communication networks using a Distance-Vector protocol, more particularly, an Enhanced Interior Gateway Routing Protocol (EIGRP).

BACKGROUND

Route summarization techniques typically rely on a router creating a summary route based on the local existence of components (e.g., host routes), and then suppressing the propagation of the components. Generally, a component should not be propagated if a summary already exists because the component will not reach the destination site. In the IP Everywhere (IPe) scenario, the summaries already exist and the components are generated independently (most likely at other routers). In other words, the generation of the summary is not tied to the existence of the component.

An access router (i.e., IPe forwarder) is moved to the network edge and decouples the IP subnet from the layer-2 virtual local area network (VLAN). All of the devices in a given VLAN in the same subnet attach to the same router. In that case, the router advertises a single subnet to other routers. With IPe, devices are in the same subnet, and are attached to different routers. As an example, in IPe, consider a network in which one has to use a device with a /32 prefix length (i.e., a 32-bit prefix). If all devices in the network have that address suffix, then there is a problem (in terms of routing efficiency) if there are thousands of routers. Customers can use EIGRP as the Interior Gateway Protocol (IGP) for IPe whereby the host routes are advertised as EIGRP routes.

BRIEF DESCRIPTION OF THE DRAWINGS

The embodiments herein will be better understood from the following detailed description with reference to the drawings, in which.

DESCRIPTION OF EXAMPLE EMBODIMENTS

Figure 1:
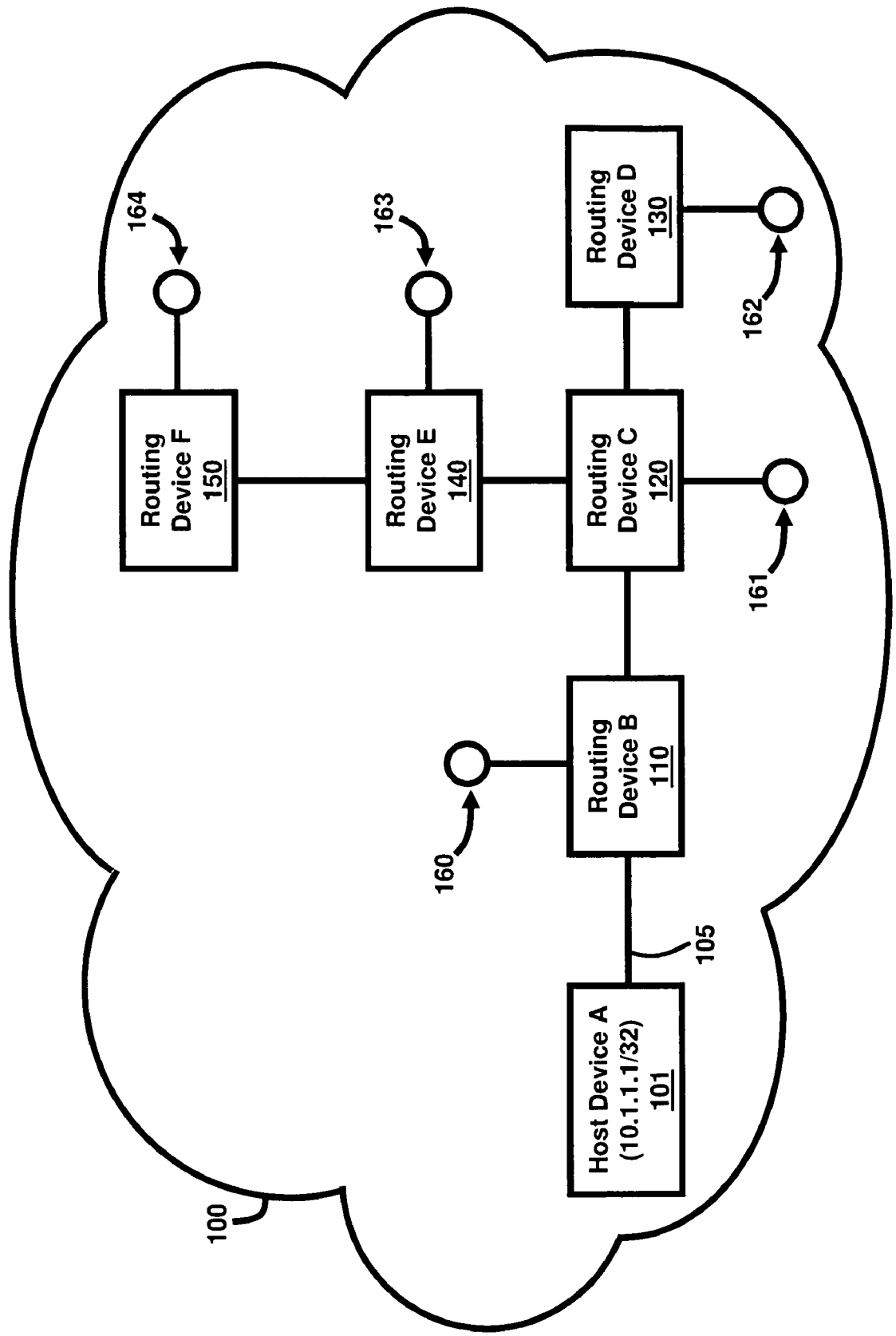
FIGS. 1 and 2 are schematic block diagrams illustrating examples of routing networks according to the embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Overview

In view of the foregoing, an embodiment herein provides a method comprising receiving, at a connection node in a communications network, a network routing address for transmitting data packets from a source node to a destination node; comparing a cost of selecting the network routing address with costs of preexisting entries of the network routing addresses in a routing table stored at the connection node; selecting the network routing address comprising the lowest cost; determining which selected neighbor connection nodes send a longest summary route covering a path to the destination node; and sending an update of the longest summary route of the network routing address to the selected neighbor connection nodes.

The connection node may comprise a router. In one embodiment, the communications network comprises an IPe network running a Distance-Vector (DV) protocol, wherein the DV protocol may comprise an EIGRP. Moreover, the method may further comprise creating a list comprising a summary of all neighbor connection nodes of the connection node; selecting a first neighbor connection node from the list; determining whether a summary route exists from the first neighbor connection node to the destination node; and removing the first neighbor connection node from the list. Additionally, the method may further comprise transmitting the summary route to the first neighbor connection node prior to the removal of the first neighbor connection node from the list. If no selected neighbor connection nodes exist, then the method may comprise sending an update of the longest summary route of the network routing address to all neighbor connection nodes. The method may further comprise transmitting the summary route to the source node towards all neighbor connection nodes of the connection node advertising a shorter prefix to reach the destination node. Furthermore, the cost comprises a network line cost associated with delay, bandwidth, reliability, traffic, and latency for the data packets to be transmitted in the communications network.

Another embodiment provides an apparatus comprising means for receiving a network routing address at a connection node in a communications network, the network routing address allowing the transmission of data packets from a source node to a destination node in the communications network; means for determining a longest summary route covering a path to the destination node; means for creating a list comprising a summary of all neighbor connection nodes of the connection node; and means for transmitting an update of the longest summary route of the network routing address towards all neighbor nodes advertising a destination address comprising a shorter address prefix, wherein the transmitting process occurs sequentially beginning with a first neighbor connection node entered in the list. In one embodiment, the connection node comprises a routing device. Also, the communications network, in one embodiment, comprises an IPe network running a DV protocol, wherein the DV protocol may comprise an EIGRP. The apparatus may further comprise means for removing the neighbor connection nodes from the list after the transmitting process. Additionally, the apparatus may further comprise means for sending an update of the longest summary route of the network routing address to all neighbor connection nodes, if no selected neighbor connection nodes exist.

Another embodiment provides an apparatus comprising a connection node located in the communications network and configured to receive a network routing address for transmitting data packets from a source node to a destination node in the communications network. A routing table is stored at the connection node and is configured to compare a cost of selecting the network routing address with costs of preexisting entries of the network routing addresses in the routing table. A processor is operatively connected to the connection node and is adapted to select the network routing address comprising the lowest cost, determine which selected neighbor connection nodes send a longest summary route covering a path to the destination node, and send an update of the longest summary route of the network routing address to the selected neighbor connection nodes. In one embodiment, the connection node comprises a routing device.

Moreover, the communications network, in one embodiment, comprises an IPe network running a DV protocol, wherein the DV protocol may comprise an EIGRP. A list is stored at the connection node and comprises a summary of all neighbor connection nodes of the connection node, wherein the processor is adapted to select a first neighbor connection node from the list, determine whether a summary route exists from the first neighbor connection node to the destination node, and remove the first neighbor connection node from the list. Furthermore, the processor is adapted to transmit the summary route to the first neighbor connection node prior to the removal of the first neighbor connection node from the list. Additionally, the processor is adapted to send an update of the longest summary route of the network routing address to all neighbor connection nodes, if no selected neighbor connection nodes exist. Also, the processor is adapted to transmit the summary route to the source node towards all neighbor connection nodes of the connection node advertising a shorter prefix to reach the destination node. Furthermore, the cost comprises a network line cost associated with delay, bandwidth, reliability, traffic, and latency for the data packets to be transmitted in the communications network.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Description

The embodiments provide a technique that stops the propagation of data based on the independent existence of a summary, and for preventing excessive transmission of routing information in a communications network. Referring now to the drawings, and more particularly to FIGS. 1 through 6, where similar reference characters denote corresponding features consistently throughout the figures, there are shown preferred embodiments.

In the specific case of an IPe sub-domain spanning in EIGRP, a known problem concerns the prevention of excessive transmission of routing information through summaries, whether configured manually or through some automatic mechanism. IPe allows enterprise customers, which may include customers ranging from small offices with a server and only a few workstations to multiregional corporations and government agencies with complex networks, to replace layer-2 switching with layer-3 routing in the distribution and access layers while keeping the flexibility and ease of use of existing layer-2 technologies.

An IPe forwarder is an IPe capable device. A set of IPe forwarders sharing the same policies and subnets make up an IPe sub-domain. Within an IPe sub-domain, IPe forwarders exchange routing information by using an IGP, which may or may not be enhanced for IPe operation depending on system requirements. IGPs are routing protocols used by a collection of IP networks and routers that have a common routing policy (i.e., an autonomous system). Furthermore, IPe sub-domain border routers exchange the routing information with non-IPe devices outside the IPe sub-domain using the traditional IGP.

FIG. 1 is a block diagram illustrating a network connection between a host device 101 and a plurality of nodes 110-150 in accordance with an embodiment herein. In the context of the embodiments herein, a connection node comprises a hardware device. For example, the connection nodes may be embodied as routers, bridges, gateways, firewalls, or switches. In the illustrated example of the network 100 of FIG. 1, node A (101) is a host device (e.g., processor) and the nodes B (110), C (120), D (130), E (140), and F (150) are routing devices (e.g., the routing devices may comprise routers, bridges, gateways, firewalls, or switches, etc.), which are interconnected via a communication link 105. Host device A (101) is operatively connected to routing device B (110); routing device B (110) is further operatively connected to routing device C (120); and routing device C (120) is further operatively connected to routing device D (130). Routing device C (120) is also operatively connected to routing device E (140), which is further operatively connected to routing device F (150). In this example, routing device B (110) advertises an internal route containing the IP address (10.1.1.1/32) of the host device A (101) to routing device C (120), and hence to routing device D (130) and routing device E (140).

The communication link 105 may comprise any form of physical media layer, such as an Ethernet, Fiber Distributed Data Interface (FDDI), or High-level Data Link Control (HDLC) serial link and may be a wireless link. The routing devices 110-150 each comprise a routing processor (not shown) for receiving a set of encrypted data packets (i.e., IP packets) from the host device A (101) and routing them to destination devices (such as other routers 110-150 or other devices (160-164) connected to the respective routing devices 110-150). Moreover, the routing processors are each configured for performing the process steps described herein, and may include specific hardware constructed or programmed for performing the process steps described herein, a general purpose processor operating under program control, or some combination thereof.

A message flow is processed through communication link 105, wherein the message flow contains a unidirectional stream of IP packets (not shown) that are transmitted (based on network-layer addresses and port numbers) between particular pairs of devices (for example, between routing devices or from the host to routing device B (110)) in the network 100. In one embodiment, the message flow is defined by a network-layer address for the host device A (101), a particular port number at the host device A (101), a network-layer address for a particular destination device (for example, devices 160-164), a particular port number at the destination device (for example, devices 160-164), and a particular transmission protocol type. For example, the transmission protocol type may identify a known transmission protocol, such as IGP, EIGRP, User Datagram Protocol (UDP), Transmission Control Protocol (TCP), Internet Control Message Protocol (ICMP), Internet Group Management Protocol (IGMP), or other suitable protocol.

In one embodiment, the host device A (101) is identified by its IP address. The particular port number at the host device A (101) is identified by either a port number which is specific to a particular process, or by a standard port number for the particular transmission protocol type. For example, a standard port number for the TCP protocol type is 6 and a standard port number for the UDP protocol type is 17. Other protocols which may have standard port numbers include the FTP protocol, the Telecommunication Network (TELNET) protocol, an internet telephone protocol, or an internet video protocol. Similarly, a particular destination device (for example, devices 160-164) is identified by its IP address; the particular port number at the destination device (for example, devices 160-164) is identified by a port number which is specific to a particular process, or by a standard port number for the particular transmission protocol type.

Alternatively, a message flow may be bi-directional instead of unidirectional, a message flow may be identified at a different protocol layer level than that of transport service access points, or a message flow may be identified responsive to other factors including information in packet headers, packet length, time of packet transmission, or routing conditions on the network (such as relative network congestion or administrative policies with regard to routing and transmission).

The routing devices (110-150) contain processing logic (not shown) configured to identify a message flow for the particular IP packet by examining the IP header for the IP packet and identifying the IP address for the host device A (101), the IP address for a destination device (for example, devices 160-164), and the protocol type for the IP packet. The routing devices (110-150) determine the port number for the host device A (101) and the port number for the destination device (for example, devices 160-164) responsive to the protocol type.

Figure 2:
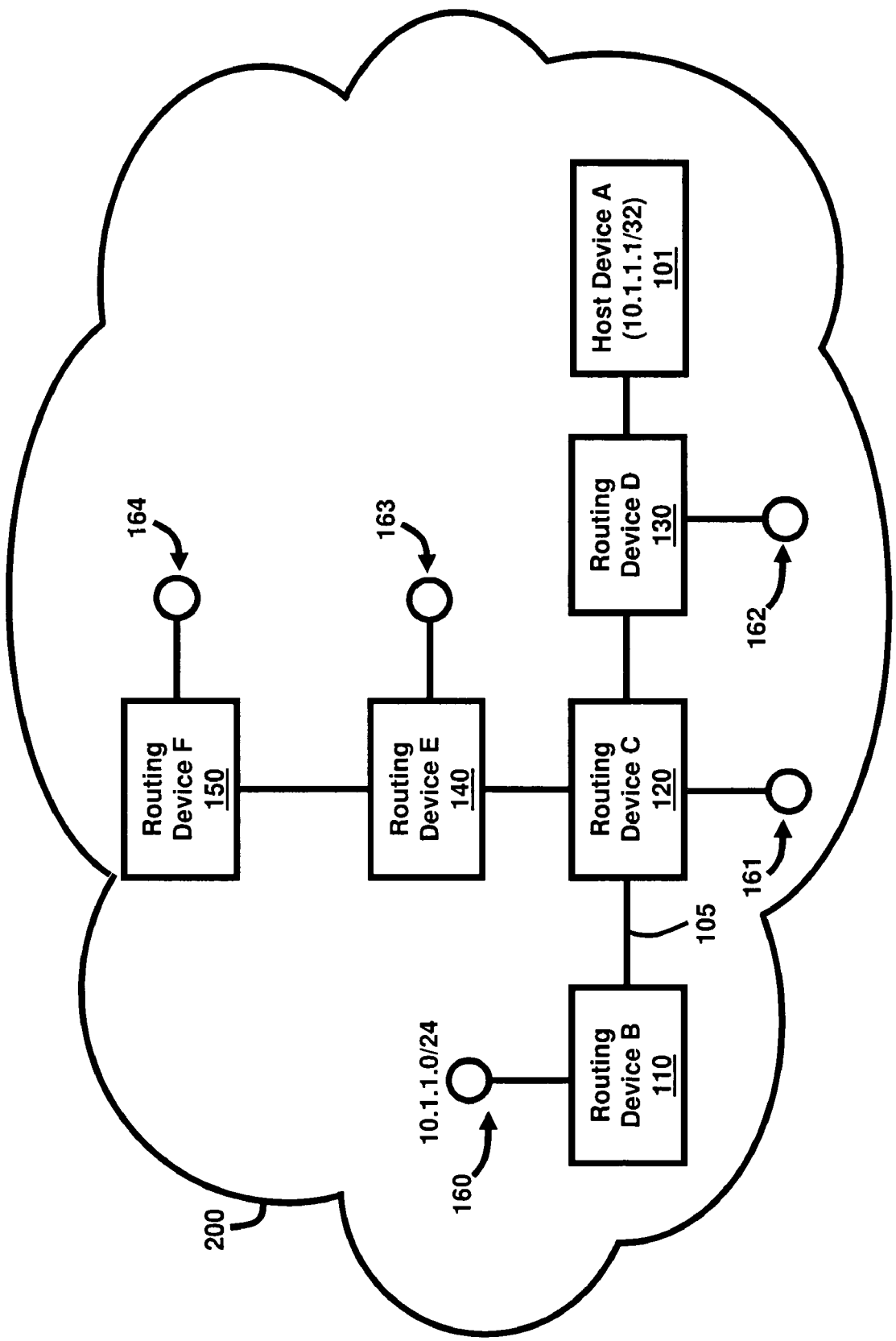

In the network 200 illustrated in FIG. 2, host device A (101) is detached from routing device B (110), and re-connected to routing device D (130). This detachment and reconnection process (i.e., event) may be facilitated by altering filtering rules and logic in the network 200. Here, host device A (101) does not change its IP address (10.1.1.1/32). Routing device D 130 learns of this new event and begins advertising an internal route that contains host device A's (101) IP address (10.1.1.1/32) to routing device C (120), and hence to routing device B (110), and routing device E (140).

Thereafter, routing device C (120), upon receiving this internal route advertisement for address 10.1.1.1/32 from routing device D (130), examines a local routing table contained in routing device C (120)). The local routing table contains a list of IP network or subnet numbers and instructions on how the routing device C (120) should forward IP packets in order to deliver the IP packets within the network 200 (or another network or subnet). For example, the routing table includes the destination network address, an appropriate port interface on the routing device C (120) through which communication should be processed, and the IP address of the next-hop routing device that needs to receive the IP packet to ensure delivery to the correct destination device (for example, devices 160-164). Moreover, the other routing devices 110, 130-150 also have their own similarly configured local routing tables. The routing device C (120) observes that it has two routes (10.1.1.1.1.0/24 and 10.1.1.1/32), both of which can provide reachability (i.e., connectivity in routing terms) to host device A (101).

The routes contained by the local routing table of routing device C (120) to reach host device A (101) will be the route of the previous hop (e.g., the previous routing device). Therefore, the routing table will contain the route to host device A (101) advertised in the previous routing hop by routing device B (110) and also the IP address of host device A (101). As the route to host device A (101), advertised by routing device D (130) is longer (i.e., contains a longer prefix length /32 than prefix length /24), therefore routing device C (120) logically assumes that the longer route prefix (/32) is the most correct route. This longest prefix determination process may include parallel depth-wise tree searching of routing tables of routing devices B-F (110-150), binary searching, clustered sequential searching, TRIE algorithms, comparison table matching, as well as other suitable techniques.

Upon determining the most correct connectivity route to host device A (101), routing device C (120) will only advertise the internal route to host device A (101) advertised by routing device D (130) towards other routing devices advertising a shorter prefix to reach the same destination. In other words, routing device C (120) determines where it will advertise 10.1.1.1/32. In conventional routing techniques, this advertisement would be propagated to all the other routers in the network, barring route aggregation or filtering. Conversely, according to the embodiments herein, routing device C (120) only advertises 10.1.1.1/32 towards routing devices advertising a shorter prefix that can reach the same destination.

In this case, routing device B (110) is advertising the internal route containing IP address 10.1.1.0/24, as per the previous routing hop, and routing device E (140) is not. Hence, routing device C (120) advertises the internal route (10.1.1.1/32) to host device A (101) advertised by routing device D (130) towards routing device B (110), which provides reachability (i.e., connectivity) towards host device A (101) for all the other devices 160 attached to routing device B (110). However, routing device C (120) does not advertise the internal route (10.1.1.1/32) to host device A (101) advertised by routing device D (130) towards routing device E (140). Furthermore, routing device E (140) forwards any IP packets for 10.1.1.1 for host device A (101) to routing device C (120), which has the more specific routing information needed to correctly route the traffic towards host device A (101), which is now attached to routing device D (130) (as opposed to being attached to routing device B (110)).

The technique provided by the embodiments herein makes summary decisions automatically, as opposed to manual configurations, which is particularly advantageous in mobility type environments, where one would normally not be able to aggregate at all. In the network 200, routing device B (110) receives the route, since it is advertising the shorter prefix overlapping the prefix, while routing device E (140) does not receive the advertisement. In this regard, this is an inward aggregation approach rather than an outward aggregation approach.

With a DV protocol, routing device C (120) would choose its best path along all the possible paths, and only advertise that path. If there were multiple links between routing device C (120) and routing device E (140), then routing device C (120) would advertise the longer prefix along all the paths it has towards routing device E (140). Accordingly, the embodiments herein provide a more efficient technique than simply advertising all routes along all paths, without changing anything about normal distance vector operation.

Thus, the embodiments herein provide a routing technique, wherein the routing information can be aggregated and filtered. This enables efficient and correct routing while minimizing routing information propagated through the IPe network 200 by preventing the excessive transmission of routing information through summaries that work in the network 200. More particularly, the technique provided by the embodiments herein determines the best aggregation points (i.e., connection nodes) through which more specific routing information should be advertised in the IPe network 200 running EIGRP.

Figure 3:
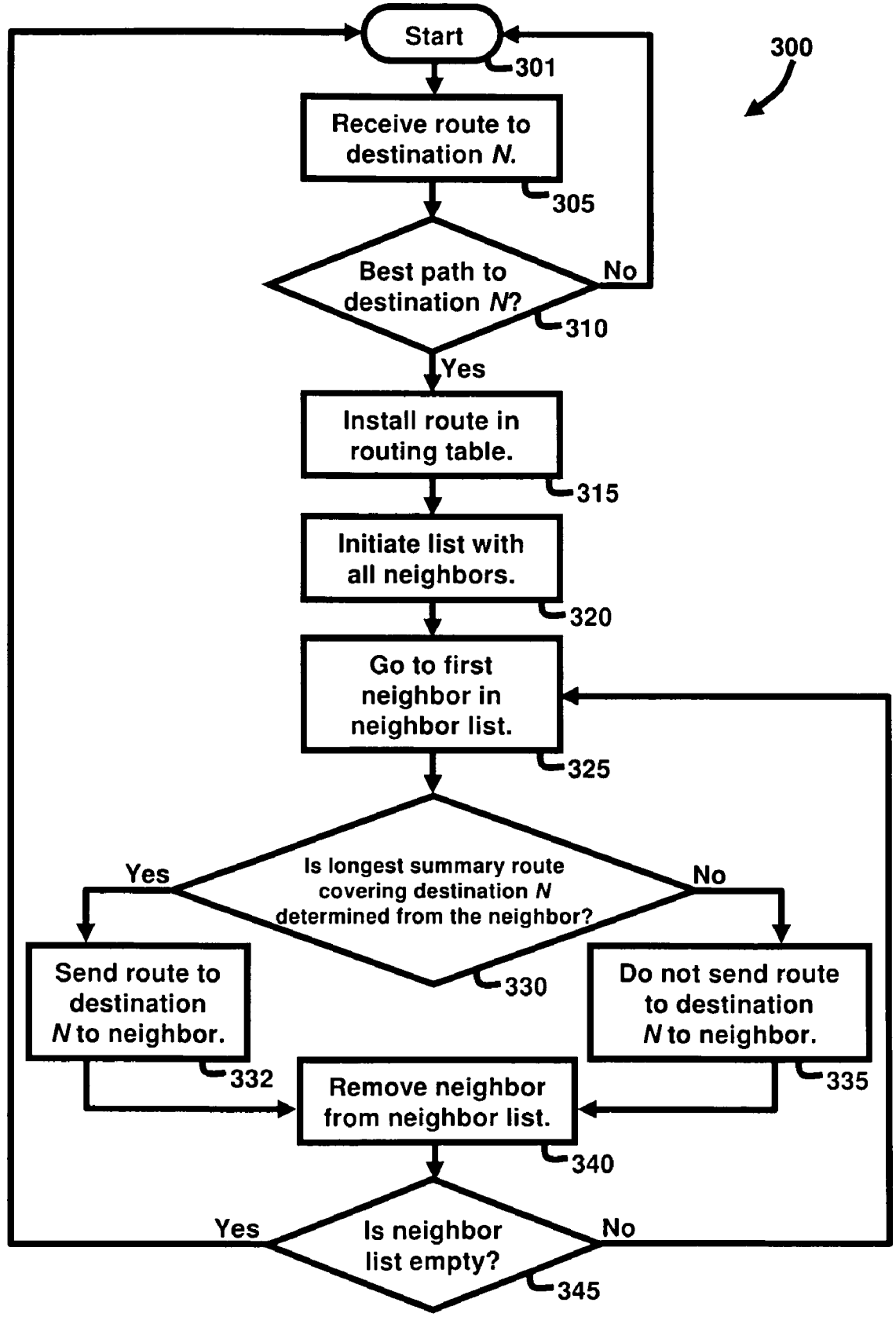
FIGS. 3 and 4 are flow diagrams illustrating examples of methods according to the embodiments herein.

FIG. 3, with reference to FIGS. 1 and 2, is a process flow diagram illustrating a method of operation of the embodiments herein. The process 300 shown in the flow diagram of FIG. 3 occurs at every routing device (110-150) in the network 200 in any sequence. In other words, the process can occur at routing device B (110) first, then routing device E (140), then routing device D (130), etc. or in any routing sequence or simultaneously.

The process 300 begins 301 with the introduction of a communication signal at a particular routing device (110-150) indicating that path routing information for an IP address is being communicated along the communication link 105 in the network 200. At step 305, a routing device (110-150) receives a route in the form of an EIGRP routing packet to a destination device (for e.g., destination device N). Thus, every routing device receives the route to destination N from a neighboring routing device. Destination device N, for example, may be represented by any IP address. Moreover, destination device N may also be an end user device. The route information received is in the form of an EIGRP routing packet. The line cost (such as delay, bandwidth, reliability, traffic, latency, etc.) to reach the destination device N is determined using a shortest path tree analysis, quality-of-service (QoS) method, or any other suitable quantitative method of determining network line cost.

Upon completion of this, at step 310, each routing device (110-150) determines whether the route to reach the destination device N received by that particular routing device (110-150) is the best path to the destination device N, in terms of line cost. If the path is not the best path (No), then the process begins 301 again. More particularly, in case the path is not the best path, the routing device (110-150) awaits for a new path to arrive at that particular routing device (110-150) and steps 305-310 are followed until the best path is received. If the path is determined to be the best path (Yes), at step 315, the routing table in each routing device (110-150) lists the route associated with the best path. Furthermore, the routing table is updated if the route is a new route and not contained by that particular routing device (110-150). Moreover, the routing table automatically overrides a previously entered route if the previous route is different from the current route associated with the best path.

Thereafter, at step 320, the routing device (110-150) initiates a list or table with all neighbors. This list may be transmitted using state packets containing the information that particular routing device (110-150) has received including the update of the best path route. For example, the state packet comprises the identity of the sender, a sequence number, age, a list of neighbors (i.e., neighboring devices), as well as an indication of what the best path is for that particular routing device (110-150). For each neighbor, the cost of routing information to that neighbor is also embedded in the state packet.

Next, at step 325, the state packet is forwarded by the routing device (110-150) to its neighbors. In one embodiment, this occurs sequentially by going to the first neighbor in the neighbor list that is initiated at step 320. After this, at step 330, in accordance with the embodiments herein, the route with the longest summary contained by the routing table of the routing device (110-150) of a neighboring routing device (110-150) is determined. Generally, this is accomplished by determining whether a shorter prefix exists at a particular routing device (110-150). Upon determining the longest summary route (Yes), at step 332, the state packet containing the route information of the longest summary route is forwarded as an updated packet towards the neighboring routing device (110-150) advertising the shorter prefix route. Conversely, the state packet is not further forwarded 335 if no shorter prefix route is determined (No) at step 330.

Irrespective of whether the route to the destination device N is sent 332 or not 335 to a neighboring device, at step 340, the neighboring routing devices (110-150) receiving the state packet containing the route information of the longest summary route, or neighboring routing devices (110-150) from which the longest summary route is not learned are removed from the list generated at step 320 of the routing device (110-150) for this route. In other words, if the neighboring routing device (110-150) does not provide a summary (i.e., shorter prefix), then it is removed from the list generated at step 320.

Afterward, at step 345, it is determined if the list containing information on the neighbors is empty. In case the list is empty (Yes), the process 300 begins from step 301 again. However, in case the list is not empty (No), the process 300 initiates from step 325. The entire process 300 repeats at every routing device (110-150) in the network 200 until the neighbor list generated at step 320 is empty. The processing speed for conducting the process 300 is largely dependent on the bandwidth of the interface associated with the routing devices (110-150) as well as the overall network bandwidth.

Figure 4:
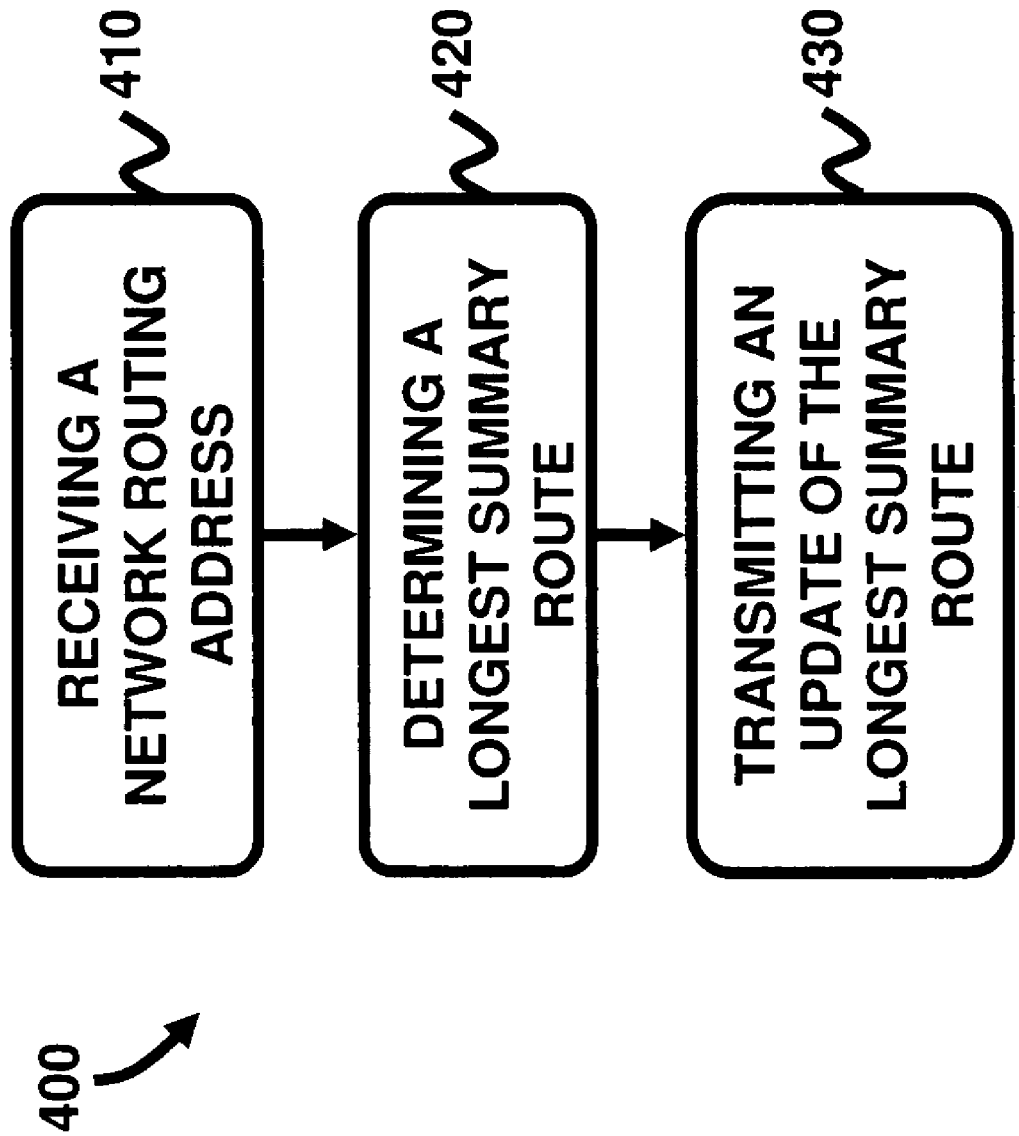

FIG. 4, with reference to FIGS. 1 through 3, is a process flow diagram illustrating a method for preventing excessive transmission of routing information in an IPe network 200 in accordance with the embodiments herein. According to the process 400, a network routing address is received 410 at a connection node (i.e., routing devices (110-150)) in a communications network 100, 200. The network routing address allows the transmission of data packets from a source node (e.g., host device A (101)) to a destination node (e.g., devices 160-164)). Upon receipt of the network routing address at the connection node, at step 420, a longest summary route covering a path to the destination node is determined. Finally, at step 430, an update of the longest summary route of the network routing address is transmitted towards nodes advertising a destination address containing a shorter prefix.

The techniques provided by the embodiments herein may be implemented on an integrated circuit chip (not shown) and may be used in routers, and implemented in the chip sets in routers. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The embodiments herein may also include both hardware and software elements and may be implemented in computer logic. The software embodiments include, but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Figure 5:
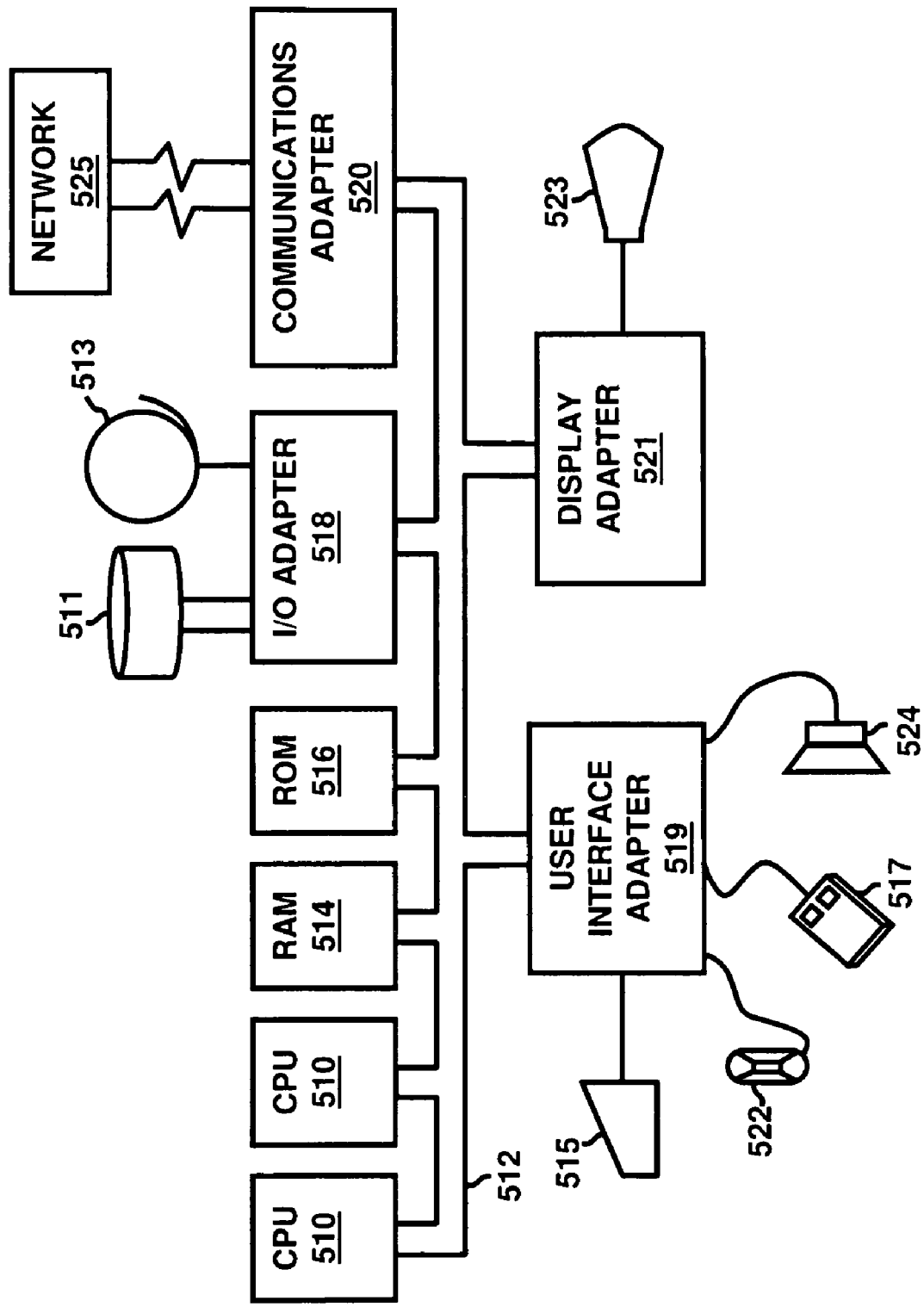
FIG. 5 is a schematic diagram illustrating an example of a computer hardware environment for practicing the embodiments herein.

A representative hardware environment for practicing the embodiments herein is depicted in FIG. 5. This schematic drawing illustrates a hardware configuration of an information handling/computer system in accordance with the embodiments herein. The system comprises at least one processor or central processing unit (CPU) 510. The CPUs 510 can be interconnected via system bus 512 to various devices such as a random access memory (RAM) 514, read-only memory (ROM) 516, and an input/output (I/O) adapter 518. The I/O adapter 518 can connect to peripheral devices, such as disk units 511 and tape drives 513, or other program storage devices that are readable by the system. The system can read the inventive instructions on the program storage devices and follow these instructions to execute the methodology of the embodiments herein. The system further includes a user interface adapter 519 that connects a keyboard 515, mouse 517, speaker 524, microphone 522, and/or other user interface devices such as a touch screen device (not shown) to the bus 512 to gather user input. Additionally, a communication adapter 520 connects the bus 512 to a data processing network 525, and a display adapter 521 connects the bus 512 to a display device 523 which may be embodied as an output device such as a monitor, printer, or transmitter, for example.

Figure 6:
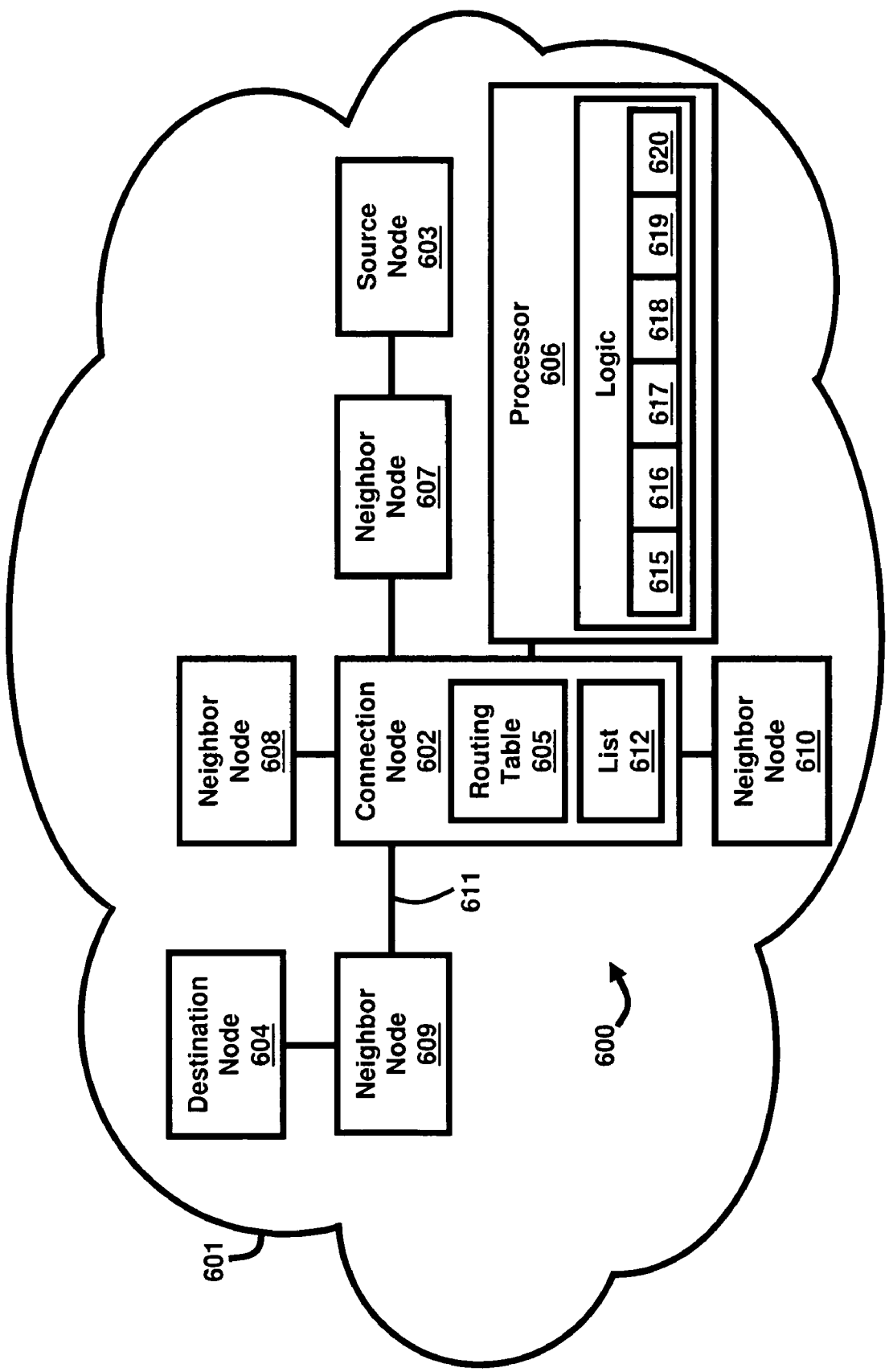
FIG. 6 is a schematic diagram illustrating a system of routing according to the embodiments herein.

FIG. 6 illustrates an apparatus 600 for preventing excessive transmission of routing information over a communications link 611 in a communications network 601, wherein the apparatus 600 comprises a connection node 602 located in the communications network 601 and configured to receive a network routing address for transmitting data packets from a source node 603 to a destination node 604 in the communications network 601. A routing table 605 is stored at the connection node 602 and compares a cost of selecting the network routing address with costs of preexisting entries of the network routing addresses in the routing table 605. The cost comprises a network line cost associated with delay, bandwidth, reliability, traffic, and latency for the data packets to be transmitted in the communications network 601. A processor 606 is operatively connected to the connection node 602 and comprises a first computer-implemented logic block 615 configured to select the network routing address comprising the lowest cost, a second computer-implemented logic block 616 configured to determine which selected neighbor connection nodes 608, 609 send a longest summary route covering a path to the destination node 604, and a third computer-implemented logic block 617 configured to send an update of the longest summary route of the network routing address to the selected neighbor connection nodes 608, 609. In one embodiment, the connection node 602 comprises a routing device.

Moreover, the communications network 601, in one embodiment, comprises an IPe network running a DV protocol, wherein the DV protocol may comprise an EIGRP. A list 612 is stored at the connection node 602 and comprises a summary of all neighbor connection nodes 607-610 of the connection node 602, wherein the processor 606 comprises a fourth computer-implemented logic block 618 configured to select a first neighbor connection node 607 from the list 612, determine whether a summary route exists from the first neighbor connection node 607 to the destination node 604, and remove the first neighbor connection node 607 from the list 612. Furthermore, the processor 606 comprises a fifth computer-implemented logic block 619 configured to transmit the summary route to the first neighbor connection node 607 prior to the removal of the first neighbor connection node 607 from the list 612. Additionally, if no selected neighbor connection nodes exist, then the processor 606 sends an update of the longest summary route of the network routing address to all neighbor connection nodes 607-610. Also, the processor 606 comprises a sixth computer-implemented logic block 620 configured to transmit the summary route to the source node 603 towards all neighbor connection nodes 607-610 of the connection node 602 advertising a shorter prefix to reach the destination node 604.

The embodiments herein may be used in any network platform implementing EIGRP in an IPe like environment. While, the embodiments herein are described in terms of EIGRP, they could apply to any distance vector summarization boundary protocol. Generally, the embodiments herein provide a tradeoff between the amount of data propagated and the optimality of the routes chosen (or the spread in the route). The embodiments herein achieve this by propagating routing changes to a set of neighbors instead of all neighbors to keep the line cost overhead low in the network 200, 601. Furthermore, the embodiments herein do not assume that EIGRP may be summarized at any point in the network 200. Rather, the embodiments herein rely on the knowledge of configured summaries in the network 200, 601. While Open Shortest Path First (OSPF) and other Link-state (LS) protocols can pre-calculate a forwarding path between any two hosts, such pre-calculation is not typically achievable in a distance vector protocol such as EIGRP thereby rendering the embodiments herein an advantageous solution for EIGRP.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method comprising:
receiving, at a connection node in a communications network, a network routing address for transmitting data packets from a source node to a destination node;
comparing a cost of selecting said network routing address with costs of preexisting entries of network routing addresses in a routing table stored at said connection node;
selecting neighbor connection nodes with the network routing address associated with the lowest cost;
determining which selected neighbor connection nodes send a summary route to the destination node having a longest destination address prefix, which is included in a different routing table, and which covers a path to said destination node;
transmitting the summary route having the longest destination address prefix to a plurality of neighbor connection nodes of the connection node configured for advertising a shorter prefix to reach said destination node;
creating a list comprising a summary of all neighbor connection nodes of said connection node;
selecting a first neighbor connection node from said list;
determining whether a summary route exists from said first neighbor connection node to said destination node; and
removing said first neighbor connection node from said list.

2. The method of claim 1, wherein said connection node comprises a router.

3. The method of claim 1, wherein said communications network comprises an Internet Protocol Everywhere (IPe) network running a Distance-Vector (DV) protocol.

4. The method of claim 3, wherein said DV protocol comprises an Enhanced Interior Gateway Routing Protocol (EIGRP).

5. The method of claim 1, further comprising transmitting said summary route to said first neighbor connection node prior to the removal of said first neighbor connection node from said list.

6. The method of claim 1, wherein if no selected neighbor connection nodes exist, then said method comprising sending an update of the summary route of the network routing address to the neighbor connection nodes.

7. The method of claim 1, wherein said cost comprises a network line cost associated with delay, bandwidth, reliability, traffic, and latency for said data packets to be transmitted in said communications network.

8. An apparatus comprising:
means for receiving a network routing address at a connection node in a communications network, the network routing address allowing the transmission of data packets from a source node to a destination node in said communications network;
means for comparing a cost of selecting said network routing address with costs of preexisting entries of network routing addresses in a routing table stored at said connection node;
means for selecting neighbor connection nodes with the routing address associated with the lowest cost;
means for determining which selected neighbor connection nodes send a summary route, which is included in a different routing table, and which covers a path to said destination node, wherein the summary route reflects a path to the destination node having a longest destination address prefix;
means for creating a list comprising a summary of all neighbor connection nodes of said connection node;
means for selecting a first neighbor connection node from said list;
means for determining whether a summary route exists from said first neighbor connection node to said destination node; removing said first neighbor connection node from said list; and
means for transmitting the summary route having the longest destination address prefix to the plurality of neighbor connection nodes of the connection node configured for advertising a shorter prefix to reach said destination node.

9. The apparatus of claim 8, wherein said connection node comprises a routing device.

10. The apparatus of claim 8, wherein said communications network comprises an Internet Protocol Everywhere (IPe) network running a Distance-Vector (DV) protocol.

11. The apparatus of claim 10, wherein said DV protocol comprises an Enhanced Interior Gateway Routing Protocol (EIGRP).

12. The apparatus of claim 8, further comprising means for removing said neighbor connection nodes from said list after said transmitting process.

13. The apparatus of claim 8, further comprising means for sending an update of the summary route of the network routing address to the neighbor connection nodes, if no selected neighbor connection nodes exist.

14. An apparatus comprising:
a connection node located in a communications network and configured to receive a network routing address for transmitting data packets from a source node to a destination node in said communications network;
a routing table stored at said connection node configured to compare a cost of selecting said network routing address with costs of preexisting entries of network routing addresses in said routing table;
a processor operatively connected to said connection node, wherein said processor is configured to:
select neighbor connection nodes with the network routing address comprising the lowest cost;
determine which selected neighbor connection nodes send a summary route to the destination node having a longest destination address prefix, which is included in a different routing table, and which covers a path to said destination node, and
sending the summary route having the longest destination address prefix to a plurality of neighbor connection nodes of the connection node configured for advertising a shorter prefix to reach said destination node, wherein a list stored at said connection node comprises a summary of the neighbor connection nodes of said connection node, wherein said processor is configured to select a first neighbor connection node from said list, to determine whether a summary route exists from said first neighbor connection node to said destination node, and to remove said first neighbor connection node from said list.

15. The apparatus of claim 14, wherein said connection node comprises a routing device.

16. The apparatus of claim 14, wherein said communications network comprises an Internet Protocol Everywhere (IPe) network running a Distance-Vector (DV) protocol.

17. The apparatus of claim 16, wherein said DV protocol comprises an Enhanced Interior Gateway Routing Protocol (EIGRP).

18. The apparatus of claim 14, wherein said processor is adapted to transmit said summary route to said first neighbor connection node prior to the removal of said first neighbor connection node from said list.

19. The apparatus of claim 14, wherein said cost comprises a network line cost associated with delay, bandwidth, reliability, traffic, and latency for said data packets to be transmitted in said communications network.

* * * * *